United States Patent [19]
Butler et al.

[11] Patent Number: 5,861,887
[45] Date of Patent: Jan. 19, 1999

[54] GRAPHIC IMAGE COMPRESSION AND STORAGE SYSTEM

[75] Inventors: Kathy Elaine Butler, Upper Marlboro, Md.; George Kenneth Sergent, Annandale, Va.

[73] Assignee: Electronic Data Systems Corporation, Plano, Tex.

[21] Appl. No.: 567,445

[22] Filed: Dec. 5, 1995

[51] Int. Cl.[6] .................................................. G06T 5/20
[52] U.S. Cl. ............................................................ 345/428
[58] Field of Search ................................ 395/128, 139; 382/232, 197, 305; 345/428, 439

[56] References Cited

U.S. PATENT DOCUMENTS

| | | | |
|---|---|---|---|
| Re. 33,316 | 8/1990 | Katsuta et al. | 364/521 |
| 4,829,453 | 5/1989 | Katsuta et al. | 382/305 |
| 4,852,019 | 7/1989 | Vinberg et al. | 364/521 |
| 4,992,887 | 2/1991 | Aragaki | 358/403 |
| 5,140,412 | 8/1992 | Shishido et al. | 358/539 |
| 5,218,431 | 6/1993 | Gleicher et al. | 348/472 |
| 5,301,268 | 4/1994 | Takeda | 395/680 |
| 5,321,520 | 6/1994 | Inga et al. | 358/403 |
| 5,343,560 | 8/1994 | Takeda et al. | 395/166 |
| 5,444,552 | 8/1995 | Smith, III | 358/465 |
| 5,463,702 | 10/1995 | Trueblood | 382/239 |
| 5,553,277 | 9/1996 | Hirano et al. | 395/600 |
| 5,557,728 | 9/1996 | Garrett et al. | 395/157 |
| 5,604,843 | 2/1997 | Shaw et al. | 395/101 |
| 5,615,287 | 3/1997 | Fu et al. | 382/232 |
| 5,615,314 | 3/1997 | Schoenzeit et al. | 395/114 |
| 5,699,489 | 12/1997 | Yokomizo | 395/109 |

OTHER PUBLICATIONS

Foley et al., Computer Graphics: Principles and Practice, Second Edition, Addison–Wesley Publishing Co., 1990, pp. 844–845.

*Primary Examiner*—Anton Fetting
*Attorney, Agent, or Firm*—Alexander B. Ching; L. Joy Griebenow

[57] ABSTRACT

A method of creating image palm prints is provided that comprises storing image data as a metafile within a clipboard storage facility (20). The metafile is then transferred to a memory device context (18). A portion of the image is then extracted using a boundary scan to discard background image data. The image is then converted into a device independent bit map and the device independent bit map is compressed to a predetermined size. The image palm print is then created by associating the compressed device independent bit map with the dimension data and palette information.

7 Claims, 1 Drawing Sheet

GRAPHIC IMAGE COMPRESSION AND STORAGE SYSTEM

TECHNICAL FIELD OF THE INVENTION

This invention relates in general to the field of data processing and more particularly to an improved system and method for processing and compressing graphic image data.

BACKGROUND OF THE INVENTION

The display, storage and manipulation of graphic images is one of the most challenging problems facing modern data processing systems. The storage and display of high resolution images require the manipulation of tremendously large amounts of data. It is also difficult to provide a user wishing access to stored images with enough information about the stored images to allow the user to select a particular image from a large number of images. Prior systems have used a combination of written description of images and other indices to indicate the nature of a particular stored image.

One approach to indexing graphic images is the use of thumbprint images. Thumbprint images are either portions of an image or a greatly reduced rendition of a graphic image. Prior art thumbprint images have been difficult to produce and manage because of the differences in the graphics formats and the difficulty in accurately representing a larger image in a smaller format.

Accordingly, a need has arisen for a graphics processing system which addresses the problems and challenges associated with prior systems for manipulating, compressing and storing graphic image data.

SUMMARY OF THE INVENTION

In accordance with the teachings of the present invention, a graphics processing system is provided that substantially eliminates or reduces problems associated with prior data processing systems and methods used to manipulate graphic image data.

According to one embodiment of the present invention, a method of processing image data to create an image palm print is provided that comprises the steps of storing image data as a metafile within a shared storage facility. The image data is then transferred to a memory device context where a portion of the image is extracted using a boundary scan. The extracted image is then converted into a device independent bit map and compressed. An image palm print is created using the compressed device independent bit map and associating therewith dimension data and palette information specifying the colors of the image.

BRIEF DESCRIPTION OF THE DRAWINGS

A more complete understanding of the present invention may be acquired by referring to the accompanying FIGURES, in which like reference numbers indicate like features and wherein.

DETAILED DESCRIPTION OF THE INVENTION

Figure 1:
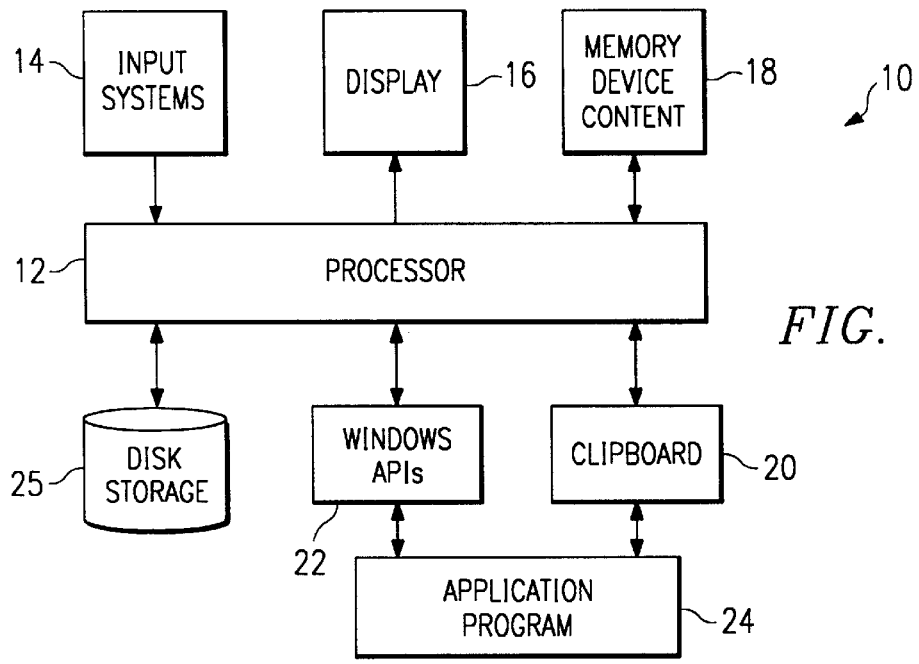
FIG. 1 is a block diagram of a graphics processing system constructed according to the teachings of the present invention.

FIG. 1 illustrates a hardware environment 10 which is suitable to support the graphics processing system of the present invention. Environment 10 comprises a processor system 12 which is accessed through input systems 14. The processor system 12 outputs information to a display 16. The processor system 12, input systems 14 and the display 16 may comprise, for example, a conventional personal computer system comprising a keyboard, other serial input devices such as a mouse comprising input system 14, and a conventional CRT monitor comprising display 16.

The processor system 12 has functional access to a memory device context 18, a shared storage facility 20, and WINDOWS application program interfaces (APIs) 22. The shared storage facility may comprise, for example, the clipboard facility in the WINDOWS operating environment or other suitable shared facilities in other environments that are available to different processes to transfer and share files and other associated information. The processor system 12 performs the instructions associated with one of many application programs 24 shown in FIG. 1. As will be discussed with reference to FIG. 2, in the context of the graphics processing system of the present invention, the processor system 12 preferably receives and transmits information through the WINDOWS APIs 22 and reads and writes data to both shared storage facility 20 and the memory device context 18 in order to retrieve, process and store various types of graphical image data. The processor system 10 also accesses a disk storage system 25 which comprises a hard disk drive, an optical storage system, a tape drive or other suitable mass storage system.

Figure 2:
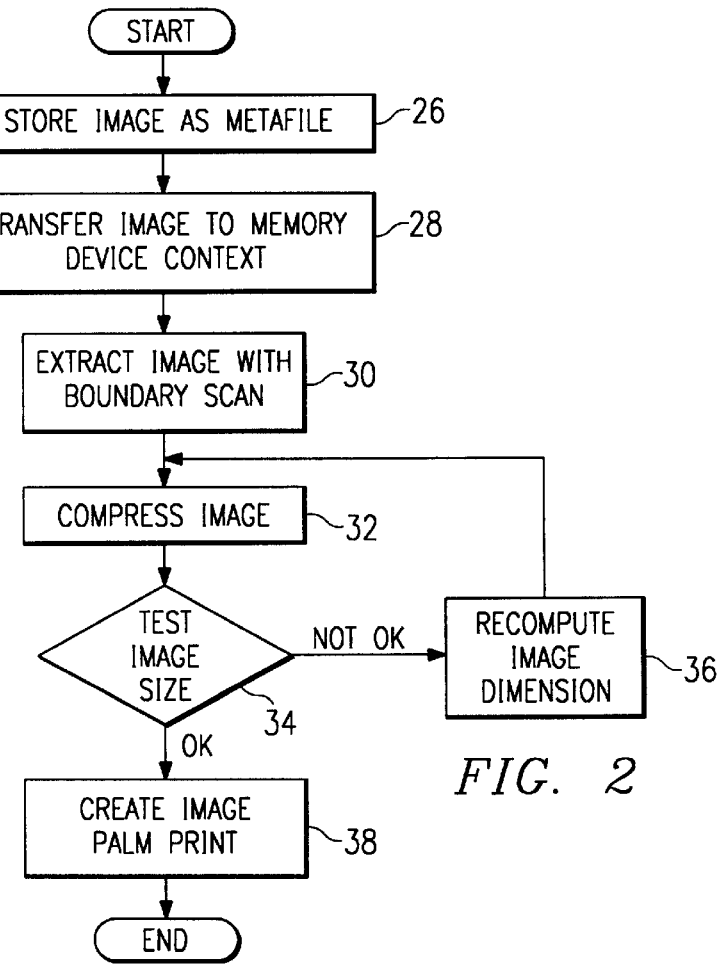
FIG. 2 is a flow chart of a method of manipulating graphic images according to the teachings of the present invention.

FIG. 2 is a flow diagram which illustrates the operation of the graphics processing system of the present invention. The method of the present invention begins at step 26 where image data is stored as a WINDOWS metafile on the shared storage facility 20. According to one embodiment of the present invention, step 26 is accomplished by instructing a relational database such as MICROSOFT ACCESS to interrogate a registration database to locate a particular image. The database application program can then instruct a graphics management program, such as a presentation manager program or the like, to retrieve the image and store it in the shared storage facility 20 as a WINDOWS metafile. The Windows metafile is an industry standard data structure that can be used efficiently to transfer graphic image data through shared memory facilities, such as a clipboard storage facility.

The system of the present invention proceeds to step 28 where the graphics processing system of the present invention retrieves the image data from the shared storage facility 20 and writes the image into the memory device context 18. The memory device context 18 is a section of random access memory which is configured to emulate a display screen. The image data is then written into the memory device context 18 as if the image were being displayed. The method then proceeds to step 30 shown in FIG. 2 where a conventional boundary scan is performed on the image data within the memory device context 18 to extract the actual image data and to eliminate any unnecessary boundary or background fields from the image. For example, an unwanted, monocolor background may be eliminated and separated from data associated with a central image by specifying such background with suitable parameters. According to one embodiment of the present invention, the boundary scan can be done with a conventional four-sided image scan which searches for the first pixel which does not comprise an identified background color. The background color can be either a fully saturated color such as white, black, red, green or blue, or it can be a specified pattern. For example, a pink background would be a predetermined pattern of red and white pixels. The boundary scan can parse through the image data until the first pixel is found in the center of the image which does not comprise the predetermined pattern. After the boundary scan is performed within step 30, the remaining image data within the memory device context 18 is converted into a device independent bit map. By using a device independent bitmap as the format, the system of the present invention is suited to operate in an environment that may include both distributed and disparate processing and storage systems. The method then proceeds to step 32 where the device independent bit map is compressed using conventional run length encoding (RLE) compression.

The system of the present invention then proceeds to step 34 where the compressed device independent bit map image is tested against a user or system supplied parametric value for the intended size of the graphic palm print. If the compressed image is not small enough, the system proceeds to step 36 where the system recomputes the image dimension and returns to step 32 where the image is once again compressed. The method then returns to step 34 where the image size is once again checked. This iterative process will continue until the image is sufficiently compressed to be used as a palm print. The system then proceeds to step 38 where the image palm print is created by combining the device independent bit map, the dimension data and a palette associated with the colors and image information. The palm print is then stored in disk storage system 25 as a WINDOWS metafile and the process terminates. The image palm print includes dimension data that instructs WINDOWS as to the size of the window needed to display the image. The image palm print also includes a device independent bitmap that includes a table of RGB values and a pixel by pixel map of indices into the table. The map may or may not be compressed using run length encoding. Finally, the image palm print includes a palette which instructs the operating environment which actual screen colors are associated with which RGB values within the device independent bit map.

The graphics system of the present invention can be advantageously implemented in a business information repository system that stores business information regarding past business activities, including proposals and other documents associated with past marketing efforts. Such past business proposals may typically involve very complex and, as such, very expensive graphic images. The ability to efficiently access and retrieve the graphic images is key to the functionality and value of such a business information repository system. The ability to translate graphic images into device independent formats and to index an abstract of the images using palm prints of the images provides a very important technical advantage to the graphics processing system of the present invention and business information repository system in which it may be implemented. A suitable business information repository system is described in applicants' patent application entitled "Business Information Repository System and Method", filed concurrently with the present application, the disclosure of which is hereby incorporated by reference into the present application as if fully set forth herein.

Accordingly, a system and method are provided that allow for the manipulation and processing of graphic images into device independent formats. This allows for the efficient use of graphic images in unlimited contexts, including disparate application programs such as word processing facilities and presentation programs. In addition, the device independent format can be compressed into a palm print of the image, which can be used as a convenient abstract of the graphic image to access the actual graphic image through a business information repository system.

Although the present invention has been described in detail, it should be understood that various changes, alterations, modifications, and substitutions may be made to the teachings described herein without departing from the spirit and scope of the present invention which is solely defined by the appended claims.

What is claimed is:

1. A method of processing graphic image data comprising the steps of:

storing image data as a metafile within a shared storage facility;

transferring the image data to a memory device context;

extracting a portion of the image data from background fields using a boundary scan;

discarding the background fields;

processing the extracted portion of the image data to create a device independent bit map;

compressing the device independent bit map to create a compressed image data set;

checking the size of the compressed image data set against a predetermined size;

repeating the steps of compressing and checking until the compressed image data set is the same size or smaller than the predetermined size;

creating an image palm print by associating the compressed image data set with image palette data; and storing the image palm print in a mass storage system.

2. The method of claim 1 wherein the step of extracting a portion of the image data comprises the step of performing a boundary scan on a plurality of sides of the image by parsing through the boundaries of the image data and discarding image data that corresponds to a predetermined image pattern.

3. The method of claim 2 wherein the predetermined image pattern comprises a predetermined colored pixel.

4. The method of claim 2 wherein the predetermined image pattern comprises a predetermined pattern of a number of disparately colored pixels.

5. The method of claim 1 wherein the shared storage facility comprises a clipboard storage facility.

6. A graphics processing system comprising:

a processor system operable to access a clipboard storage facility and a memory device context;

an input system coupled to the processor system and operable to provide commands to the processor system;

a display system coupled to the processor system and operable to display graphic images to a user of the graphics processing system;

the processor system operable to execute application programs to retrieve image data and to convert and store the image data as a metafile within the clipboard storage facility;

the processor system further operable to access the clipboard storage facility and retrieve the metafile and write the metafile into the memory device context;

the processor system further operable to perform a boundary scan on the image data within the memory device context to extract and discard background fields from the image data leaving a remainder image; and the processor system further operable to convert the remainder image to a device independent bit map and to compress the device independent bit map to a predetermined image size using an iterative process.

7. The system of claim 6 wherein the processor system is further operable to create an image palm print by associating the compressed device independent bit map with dimension data and palette data specifying respectively the size of the decompressed image and a plurality of colors associated with the image data.

* * * * *